Feb. 12, 1935.  C. G. WOOD  1,990,683
CLUTCH PLATE
Filed Aug. 21, 1933

INVENTOR.
Clarence G. Wood
BY
Fay, Oberlin & Fay
ATTORNEYS.

Patented Feb. 12, 1935

1,990,683

UNITED STATES PATENT OFFICE 1,990,683

CLUTCH PLATE

Clarence G. Wood, Cleveland Heights, Ohio

Application August 21, 1933, Serial No. 685,997

8 Claims. (Cl. 192—68)

The present invention relating, as indicated, to clutch plates has more precise reference to that particular part of a clutch assembly which is adapted to intermittently transmit torque from a driving flange to a driven shaft. It is contemplated that the clutch plate embodying the principle of my invention be best adapted for use in an internal combustion engine clutch assembly and that such clutch plate be positioned between the flywheel and pressure engaging means known as the pressure plate.

Since it is the major function of a clutch plate to transmit torque from a power source to a torque resistant element, such as a propeller shaft of an automobile, it is necessary that means be provided to impart a cushioning effect to such a torque transmitting element. In an automobile particularly the vibrations which are imposed upon the crank shaft by the irregular impulses of the cylinders and the back-lash from the rear wheels upon the propeller shaft become concentrated at the clutch. Accordingly, a so-called "flexible center" clutch plate functions as a vibration dampener. Since the torque of an internal combustion engine increases very rapidly with respect to the velocity of the engine, it is paramount that a vibration dampener, which is intended to transmit such torque, possess a similar rate of torque resistance. Therefore, it is one of the objects of my invention to provide a novel form of construction for incorporating resilient or spring elements between the hub and disk of a clutch plate in which the increase in spring resistance conforms substantially to the rate of increase of torque applied. It is a further object to so design the assembly of these spring elements in order that a maximum cushioning effect will be obtained with a minimum movement of the parts; and to provide such a cushioning element which will possess the advantages of efficient operation and durability.

Other objects and advantages of the invention will become apparent as the following description proceeds.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Figure 1:
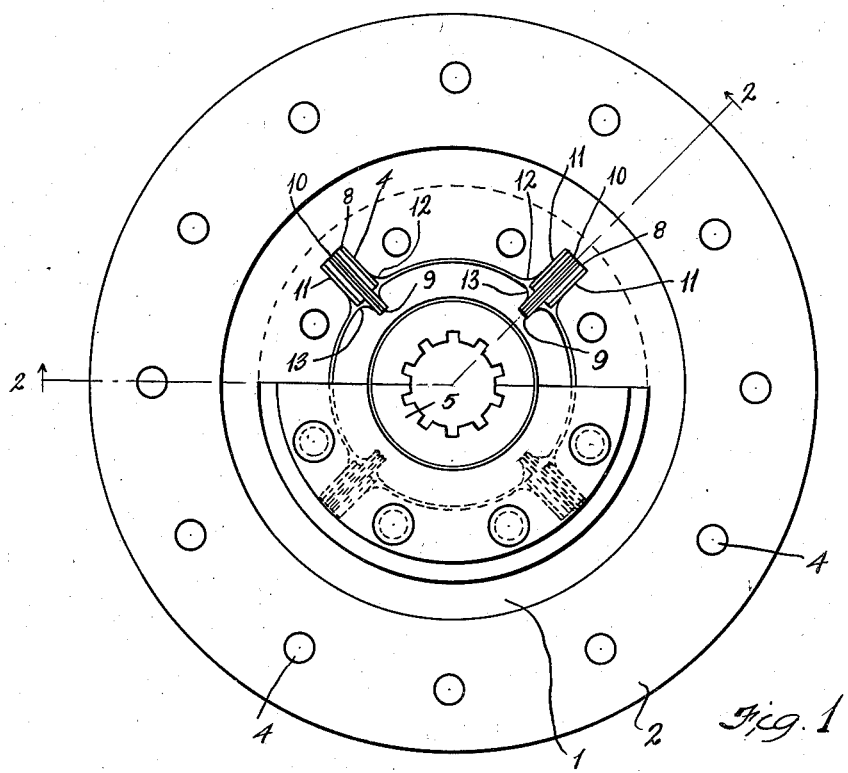
Figure 2:
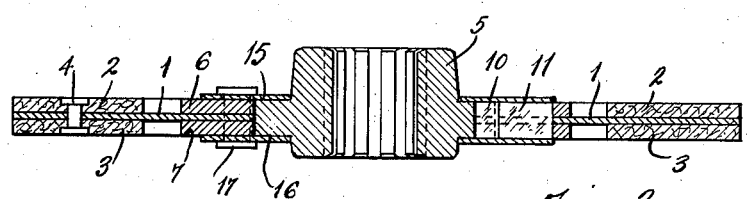
Figure 3:
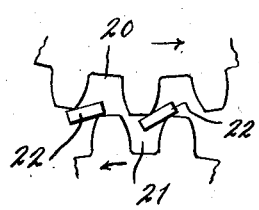

Fig. 1 is a plan view of the clutch plate embodying the principle of my invention; Fig. 2 is a transverse section of Fig. 1 taken substantially along line 2—2 thereof; Fig. 3 is a view illustrating the principle of operation of the spring elements; and Figs. 4 and 5 are enlarged views of the spring elements illustrating the manner in which the latter function upon torque application.

Now, referring more particularly to the drawing in Figs. 1 and 2, there has been shown therein a clutch plate consisting of a flat disk member 1, to which there is attached on either side the friction facing rings 2 and 3. Suitable rivet fasteners 4 may be provided in order to secure the facing rings 2 and 3 to the face of the disk 1. The facing rings 2 and 3 are adapted to be intermittently contacted by the flywheel and the pressure plate of the clutch assembly. Such a latter assembly, being well known in the art, is therefore not illustrated. A splined hub 5 is positioned centrally of the disk 1. The hub 5 is adapted to engage with the stub shaft of the clutch and constitutes the driven member of the clutch plate. The hub 5 is made movable with respect to the disk body 1. Reinforcing plates 6 and 7 are secured to the disk body 1 adjacent the outer periphery of the hub 5. There is a series of recesses 8 formed in the inner periphery of the disk 1 and the reinforcing plates 6 and 7. Similarly there are a plurality of recesses 9 formed in the outer periphery of the hub 5. The recesses 8 and 9 are positioned in radial registry with respect to each other. Spring elements composed of the relatively thin leaves 10 and the relatively thick leaves 11 are received in the recesses 8 and 9. The thicker spring leaves 11 are disposed on the outer sides of the laminated spring elements and extend only as far as the outer periphery of the hub 5. The outer edges of the recesses 8 and 9 are curved as shown at the points 12 and 13. The cover plates 15 and 16 are secured in position by suitable fasteners such as the rivets 17.

The operation of the above described construction is substantially as follows: When torque is suddenly applied to the clutch plate, it would be transmitted from the disk 1 to the hub 5. Since the hub 5 is joined to the disk 1 only by means of the resilient laminated springs, there will result a flexing or bending action upon the springs which will tend to absorb the sudden application of torque and thereby produce a cushioning effect. By reason of the fact that the relatively heavy leaves are positioned on the outside of the laminated spring elements, the bending action during the transmission of torque will be transferred throughout a greater area of the thinner leaves 10 than would be the case if the heavy leaves 11 were not present. This latter action is well illustrated in Fig. 5. In other words, whenever a laminated spring element composed of uniform thicknesses of leaves is subjected to a bending movement, there is a tendency for the strain to concentrate at one point which is the longitudinal center of the laminated spring element. However, when the heavier outside leaves 11 are present, such a concentration of bending strain will have a tendency to be distributed throughout a greater area of the spring element and will not be concentrated at a single point where premature failure would occur.

Figures 4, 5:
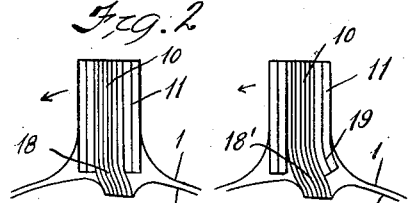

Directing attention to Figs. 4 and 5, when relative movement between the disk 1 and hub 5 first occurs, that is, upon initial clutch engagement, the lower or inner ends of the thin leaves will be flexed over a relatively short length, as indicated by the numeral 18. The heavier leaves 11 will not be subjected to bending action upon initial movement. It will also be seen that since the thin leaves 10 are bent over a relatively short portion of their length that the bending leverage is small and that there will result a relatively stiff spring action. This means that the clutch plate upon initial movement offers a maximum spring resistance in proportion to such movement. As the applied torque is increased and greater relative movement between the hub 5 and disk 1 occurs, the spring elements will assume a bending deformation, as shown in Fig. 5. In this latter view the thin leaves have been flexed over a relatively greater length, as indicated by the numeral 18'. The thick leaves are also subjected to a bending over their end portions, as indicated by the numeral 19. In other words, a cumulative spring resistance has been set up which is substantially similar to the rate of torque increase.

It is of utmost importance that the above described spring action be present in the clutch plate. In the majority of automobiles the initial torque application amounts to about 40 or 50 foot-pounds, increasing to a maximum of 140 to 200 foot-pounds. Therefore, if a spring element, which is adapted to absorb and transmit such torque, has a relatively weak initial spring resistance, it will be seen that the sudden application of torque will flex the spring to a maximum, and then when the torque resistance of the driven element is overcome and becomes substantially equal to that of the torque applied, there will result an oscillating effect due to the tendency of such a weak spring element to return to its unflexed position. That is to say, where the rate of change of spring resistance is not substantially similar to the rate of change of the torque applied, the vibrational effect will be aggravated rather than eliminated.

The rounded edges 12 and 13 upon the recesses 8 and 9 also serve an advantageous function in that they produce a wedging rather than a shearing action upon the spring elements. This function is illustrated in Fig. 3 in which have been shown sections of two external gears 20 and 21 having tangential outer peripheries. Two flat strips 22 have been inserted between the teeth of the gears 20 and 21 and it will be seen that these pieces 22 are functioning as wedge members against the edges of the teeth when the gears are rotated in opposite directions. This latter action, as illustrated in Fig. 3, is substantially analogous to the action that takes place between the disk 1 and the hub 5. That is to say, the spring elements positioned in the recesses which have rounded edges corresponding to the rounded edges of the gear teeth serve as wedging elements when the disk 1 and hub 5 are approaching a point of maximum movement. Therefore, it is apparent that the torque absorbing or cushioning action, which is present in my clutch plate, is dependent both upon the resilient bending force of the spring elements as well as a wedging action.

The above described clutch plate construction is of particular advantage in an internal combustion engine vehicle in which the repeated shocks of torque transmission are numerous and severe.

Other forms may be employed embodying the features of my invention instead of the one here explained, change being made in the form or construction, provided the elements stated by any of the following claims or the equivalent of such stated elements be employed.

I therefore particularly point out and distinctly claim as my invention:—

1. In a clutch plate, the combination of a disk member, a hub member centrally disposed in said disk member and movable with respect thereto, a series of laminated spring elements having each end anchored in said hub member and said disk member respectively, said spring elements including relatively thick and heavy leaves disposed on their outer sides, said last-named leaves remaining unflexed upon initial relative movement of said disc and hub members, and being adapted to flex on further and final relative movement thereof.

2. In a clutch plate, the combination of a disk member, a hub member centrally disposed in said disk member and movable with respect thereto, a series of laminated spring elements having each end anchored in said hub member and said disk member respectively, said spring elements being composed of a plurality of relatively thin leaves in the medial portion and relatively thick leaves disposed on their outer sides, said thin leaves only being adapted to flex on initial relative movement of said disc and hub members, and all of said leaves being adapted to flex on further and final relative movement thereof.

3. In a clutch plate, the combination of a disk member, a hub member centrally disposed in said disk member and movable with respect thereto, a series of laminated spring elements having each end anchored in said hub member and said disk member respectively, said spring elements including relatively thick and heavy leaves disposed on their outer sides, and only one end of said heavy leaves being secured to said disk member, the other end being free to flex.

4. In a clutch plate, the combination of a disk member, a hub member centrally disposed in said disk member and movable with respect thereto, a series of laminated spring elements having each end anchored in said hub member and said disk member respectively, said spring elements being composed of a plurality of relatively thin leaves in the medial portion and relatively thick leaves disposed on their outer ends, said thick leaves being substantially shorter than said thin leaves and having one end free to flex.

5. In a clutch plate, the combination of a disk member, a hub member centrally disposed in said disk member and movable with respect thereto, oppositely disposed radial recesses in said disk and hub members respectively, spring elements having each end engaging with said recesses, and rounded shoulders on the outer edges of said recesses, said spring elements being composed of a plurality of flat leaves, including relatively thick leaves disposed on the outer sides, said last-named leaves remaining unflexed upon initial relative movement of said disc and hub members, and being adapted to flex on further and final relative movement thereof.

6. In a clutch plate, the combination of a disk member, a hub member centrally disposed in said disk member and movable with respect thereto, oppositely disposed radial recesses in said disk and hub members respectively, spring elements having each end engaging with said recesses, and rounded shoulders on the outer edges of said recesses, said spring elements being composed of a plurality of relatively thin leaves in the medial portion and relatively thick leaves disposed on the outer sides, said thin leaves only being adapted to flex on initial relative movement of said disc and hub members, and all of said leaves being adapted to flex on further and final relative movement thereof.

7. In a clutch plate, the combination of a disk member, a hub member centrally disposed in said disk member and movable with respect thereto, oppositely disposed radial recesses in said disk and hub members respectively, spring elements having each end engaging with said recesses, and rounded shoulders on the outer edges of said recesses, said spring elements being composed of a plurality of relatively thin leaves in the medial portion and relatively thick leaves disposed on the outer sides and only one end of said heavy leaves being secured to said disk member, the other end being free to flex.

8. In a clutch plate, the combination of a disk member, a hub member centrally disposed in said disk member and movable with respect thereto, oppositely disposed radial recesses in said disk and hub members respectively, spring elements having each end engaging with said recesses, and rounded shoulders on the outer edges of said recesses, said spring elements being composed of a plurality of relatively thin leaves in the medial portion and relatively thick leaves disposed on the outer sides, said thick leaves being substantially shorter than said thin leaves and having one end free to flex.

CLARENCE G. WOOD.